United States Patent
Kinoshita

(10) Patent No.: US 12,049,225 B2
(45) Date of Patent: Jul. 30, 2024

(54) TRAVEL CONTROL DEVICE, TRAVEL CONTROL METHOD, AND TRAVEL CONTROL PROGRAM

(71) Applicant: DENSO CORPORATION, Kariya (JP)

(72) Inventor: Tomohiro Kinoshita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/807,269

(22) Filed: Jun. 16, 2022

(65) Prior Publication Data
US 2022/0402495 A1    Dec. 22, 2022

(30) Foreign Application Priority Data

Jun. 21, 2021 (JP) .................... 2021-102749

(51) Int. Cl.
*B60W 30/12* (2020.01)
*B60W 30/045* (2012.01)
*B60W 30/18* (2012.01)

(52) U.S. Cl.
CPC .... *B60W 30/18145* (2013.01); *B60W 30/045* (2013.01); *B60W 30/12* (2013.01); *B60W 2552/40* (2020.02)

(58) Field of Classification Search
CPC ......... B60W 30/18145; B60W 30/045; B60W 2540/18; B60W 40/068; B60W 30/10; B60W 30/12; B60W 2552/40
See application file for complete search history.

(56) References Cited

U.S. PATENT DOCUMENTS

| | | | | |
|---|---|---|---|---|
| 6,427,108 | B1* | 7/2002 | Kanasugi | ............. B60K 28/165 |
| | | | | 477/118 |
| 7,599,763 | B2* | 10/2009 | Matsumoto | ..... B60W 30/18145 |
| | | | | 701/1 |
| 2020/0001891 | A1 | 1/2020 | Takano et al. | |

FOREIGN PATENT DOCUMENTS

JP        2010-247585 A    11/2010

* cited by examiner

*Primary Examiner* — Khoi H Tran
*Assistant Examiner* — Dairon Estevez
(74) *Attorney, Agent, or Firm* — MASCHOFF BRENNAN

(57) ABSTRACT

A travel control device is provided as a vehicle control ECU for controlling a travel of a vehicle. The vehicle control ECU includes: a resistance estimator estimating a cornering resistance, which is a travel resistance acting on the vehicle in a curved travel section where a curved travel of the vehicle is scheduled; a correction determiner determining whether the cornering resistance is out of an allowable resistance range; and a correction setter setting a correction amount when it is determined that the cornering resistance is out of the allowable resistance range.

16 Claims, 7 Drawing Sheets

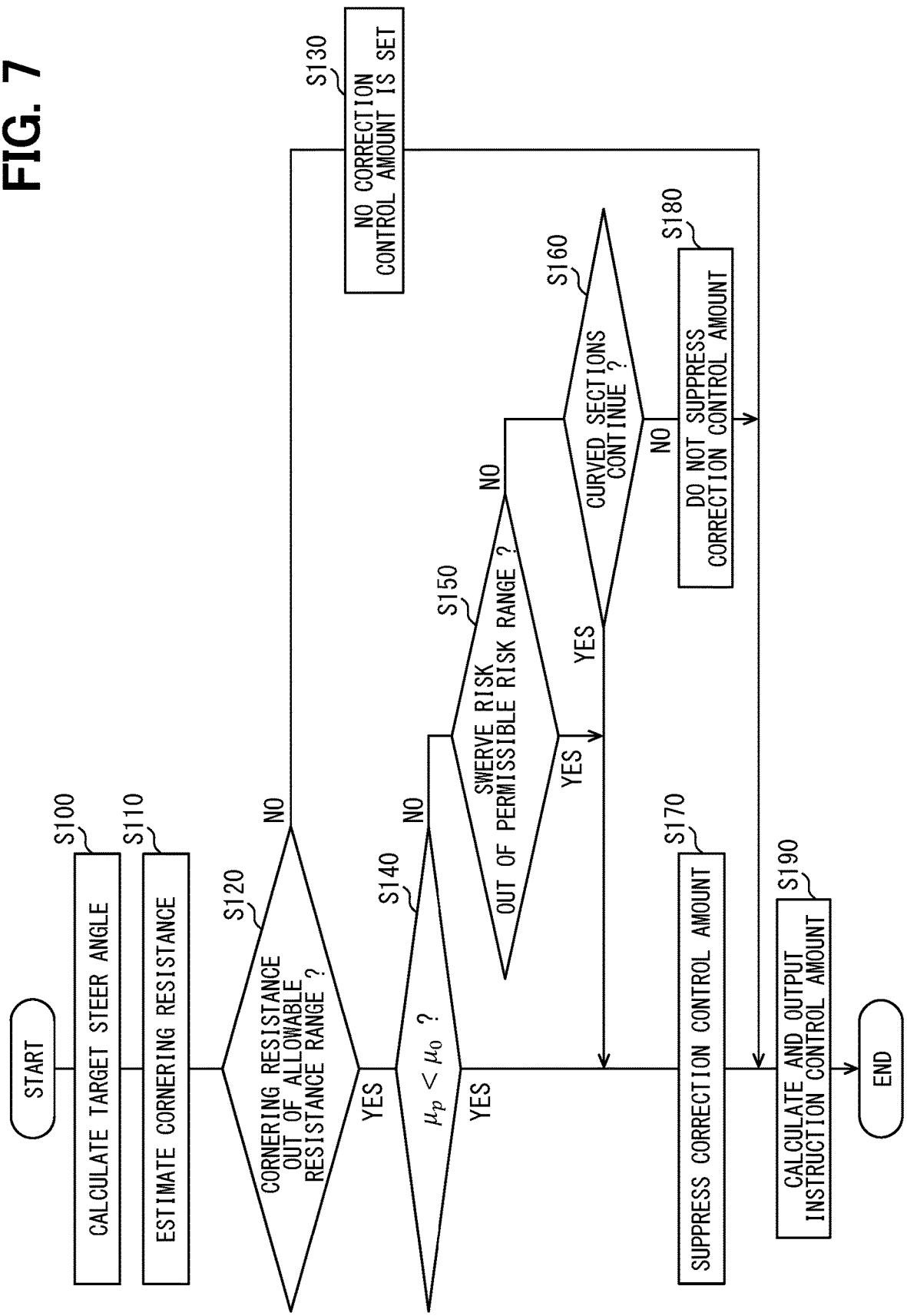

TRAVEL CONTROL DEVICE, TRAVEL CONTROL METHOD, AND TRAVEL CONTROL PROGRAM

CROSS REFERENCE TO RELATED APPLICATION

The present application is based on and claims the benefit of priority of Japanese Patent Application No. 2021-102749, filed on Jun. 21, 2021, the disclosure of which is incorporated herein by reference.

TECHNICAL FIELD

The present disclosure generally relates to a technique for controlling a travel of a vehicle.

BACKGROUND INFORMATION

A comparable patent document discloses a technique of estimating a cornering resistance that will occur in the future and applying a driving force corresponding to the cornering resistance as a correction amount with respect to a control amount.

However, due to the delay in the response of the vehicle to the output of the control amount, the timing of occurrence of the cornering resistance and the response timing of the vehicle to the output of the corresponding correction amount may deviate from each other. Due to such deviation, the occupant of the vehicle may feel uncomfortable/discomfort with the travel of the vehicle under such control.

SUMMARY

It is an object of the present disclosure to provide a travel control device, a travel control method, and a travel control program enabling a travel with reduced discomfort of an occupant of a vehicle.

The disclosed aspects in the specification adopt different technical solutions from each other in order to achieve their respective objectives.

BRIEF DESCRIPTION OF THE DRAWINGS

Objects, features, and advantages of the present disclosure will become more apparent from the following detailed description made with reference to the accompanying drawings, in which:

FIG. 7 is a flowchart showing an example of a travel control method performed by the travel control device.

DETAILED DESCRIPTION

First Embodiment

Figure 1:
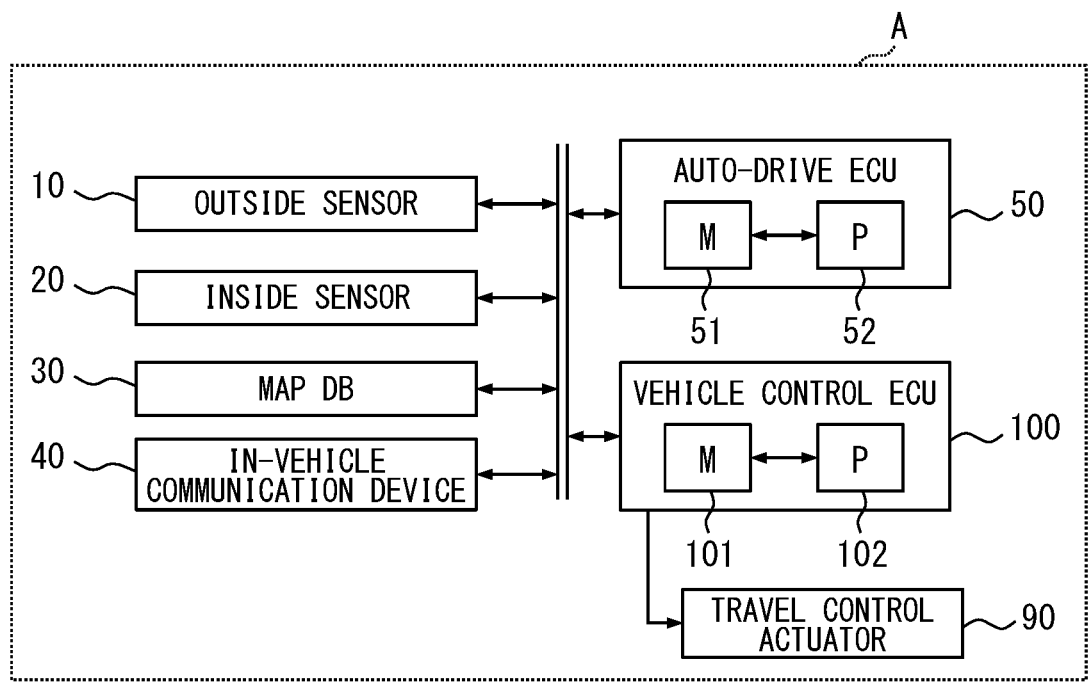
FIG. 1 is a diagram simply showing an overall configuration of a vehicle including a travel control device.

A travel control device of the first embodiment will be described with reference to FIGS. 1 to 7. The travel control device of the first embodiment is provided by a vehicle control ECU 100. The vehicle control ECU 100 is an electronic control device mounted on a vehicle A. The vehicle control ECU 100 is connected to an outside sensor 10, an inside sensor 20, a map database (hereinafter, "DB") 30, an in-vehicle communication device 40, and an auto-drive ECU 50 via a communication bus or the like.

The outside sensor 10 acquires information on an outside world, which is a surrounding environment of the vehicle A. The outside sensor 10 may acquire outside world information by detecting a target existing in the outside world of the vehicle A. The target detection type outside sensor 10 is, for example, at least one of a camera, a LiDAR (Light Detection and Ranging/Laser Imaging Detection and Ranging), a radar, a sonar, and the like.

The inside sensor 20 acquires sensor information of an inner world, which is an internal environment of the vehicle A. The inside sensor 20 may acquire the inner world information by detecting a specific kinetic physical quantity in the inner world of the vehicle A. The physical quantity detection type inside sensor 20 is at least one of, for example, a travel speed sensor, an acceleration sensor, a gyro sensor, and the like. The inside sensor 20 may acquire the inner world information by detecting a specific state of an occupant in the inner world of the vehicle A. The occupant detection type inside sensor 20 is at least one of, for example, a driver status monitor (registered trademark), a biological/biometric sensor, a seating sensor, an actuator sensor, an in-vehicle device sensor, and the like.

The map database (hereinafter, "DB") 30 stores map information that can be used by the auto-drive ECU 50 or the vehicle control ECU 100. The map DB 30 includes at least one type of non-transitory, tangible storage medium, such as a semiconductor memory, a magnetic medium, an optical medium and the like. The map DB 30 may be a database of a locator that estimates a self-state quantity including a self-position of the vehicle A. The map DB 30 may be a database of a navigation unit for navigating a travel path/route of the vehicle A. The map DB 30 may be configured by combining a plurality of types of the above-described databases and the like.

The map DB 30 acquires and stores the latest map information, for example, by communicating with an external center via a V2X type in-vehicle communication device 40. Here, the map information is converted into two-dimensional or three-dimensional data as information representing a travel environment of the vehicle A. In particular, as three-dimensional map data, it may be preferable to adopt digital data of a high-precision map. The map information may include road information representing at least one type of, for example, a position, a shape, and a road surface condition of a road itself. The map information may include marking information representing at least one type of, for example, a position and shape of a sign and a lane marking attached to/associated with a road. The map information may include structure information representing at least one type of, for example, a position and shape of a building facing a road, of a traffic light and the like.

The in-vehicle communication device 40 acquires communication information that can be used by the auto-drive ECU 50 or the vehicle control ECU 100 by wireless communication. The in-vehicle communication device 40 may receive a positioning signal from a GNSS (Global Navigation Satellite System) artificial satellite existing in the outside world of the vehicle A. The positioning type in-vehicle communication device 40 is, for example, a GNSS receiver or the like. The in-vehicle communication device 40 may transmit and receive a communication signal to and from the V2X system existing in the outside world of the vehicle A. The V2X type in-vehicle communication device 40 is at least one type among, for example, a DSRC (Dedicated Short Range Communications) communication device, a cellular V2X (C-V2X) communication device, and the like. The in-vehicle communication device 40 may transmit and receive a communication signal to and from a terminal existing in the inner world of the vehicle A. The terminal communication type in-vehicle communication device 40 is at least one of, for example, a Bluetooth (Bluetooth: registered trademark) device, a Wi-Fi (registered trademark) device, an infrared communication device, and the like.

The auto-drive ECU 50 has a configuration including, as a main component, a computer including a memory 51, a processor 52, an input/output interface, a bus connecting the above, and the like. The processor 52 is hardware for arithmetic processing. The processor 52 includes, for example, at least one of a CPU (Central Processing Unit), a GPU (Graphics Processing Unit), a RISC-CPU (Reduced Instruction Set Computer), and the like as a core.

The memory 51 is a non-transitory, substantive storage medium which non-transitorily stores or memorizes a computer-readable program, data, and the like, such as for example, at least one type of semiconductor memories, magnetic media, optical media, and the like. The memory 51 stores various programs executed by the processor 52, such as an auto-drive program and the like.

The processor 52 executes a plurality of instructions included in the auto-drive program stored in the memory 51. As a result, the auto-drive ECU 50 exerts a function of controlling an execution of an auto-drive mode. The auto-drive mode is a control mode of the vehicle A, which is divided into levels according to the degree of manual intervention of the occupant in the driving task. The auto-drive mode may be realized by autonomous driving control in which the operating system performs all driving tasks, such as conditional driving automation, advanced driving automation, or full driving automation. The auto-drive mode may be realized by advanced driving support control in which the occupant performs some or all driving tasks, such as driving assistance or partial driving automation. The auto-drive mode may be realized by combining or switching between the autonomous driving control and the advanced driving support control.

In the auto-drive mode, the auto-drive ECU 50 generates a target trajectory in the traveling of the vehicle A. The target trajectory contains information on future target positions of the vehicle A and a target speed at each target position. The target trajectory may include a target control amount which is a control amount of acceleration for traveling at a target speed at a target position. The auto-drive ECU 50 sequentially provides the generated target trajectory to the vehicle control ECU 100.

The vehicle control ECU 100 is an electronic control device that at least controls an acceleration of the vehicle A. The acceleration control here includes a drive control according to a driving force acting in a traveling direction and a braking control according to a braking force acting in an opposite direction of the traveling direction. In the acceleration control in the auto-drive mode, the vehicle control ECU 100 determines the control amount of the acceleration applied to the vehicle A based on the target trajectory. The vehicle control ECU 100 outputs the determined control amount to a travel control actuator 90.

The travel control actuator 90 here is, for example, an electronically-controlled throttle and brake actuator. The travel control actuator 90 applies a corresponding driving force or braking force to the vehicle A based on the control amount. As a result, the vehicle A can travel at an acceleration corresponding to the driving force or the braking force. The vehicle control ECU 100 may execute steering control in addition to acceleration control.

The vehicle control ECU 100 mainly includes a computer including a memory 101, a processor 102, an input/output interface, and a bus connecting the above. The processor 102 is hardware for arithmetic processing. The processor 102 includes at least one of, for example, a CPU, a GPU, a RISC-CPU, and the like as a core.

The memory 101 is a non-transitory, substantive storage medium which non-transitorily stores or memorizes a computer-readable program, data, and the like, such as for example, at least one type of semiconductor memories, magnetic media, optical media, and the like. The memory 101 stores various programs executed by the processor 102, such as a travel control program described later.

Figure 2:
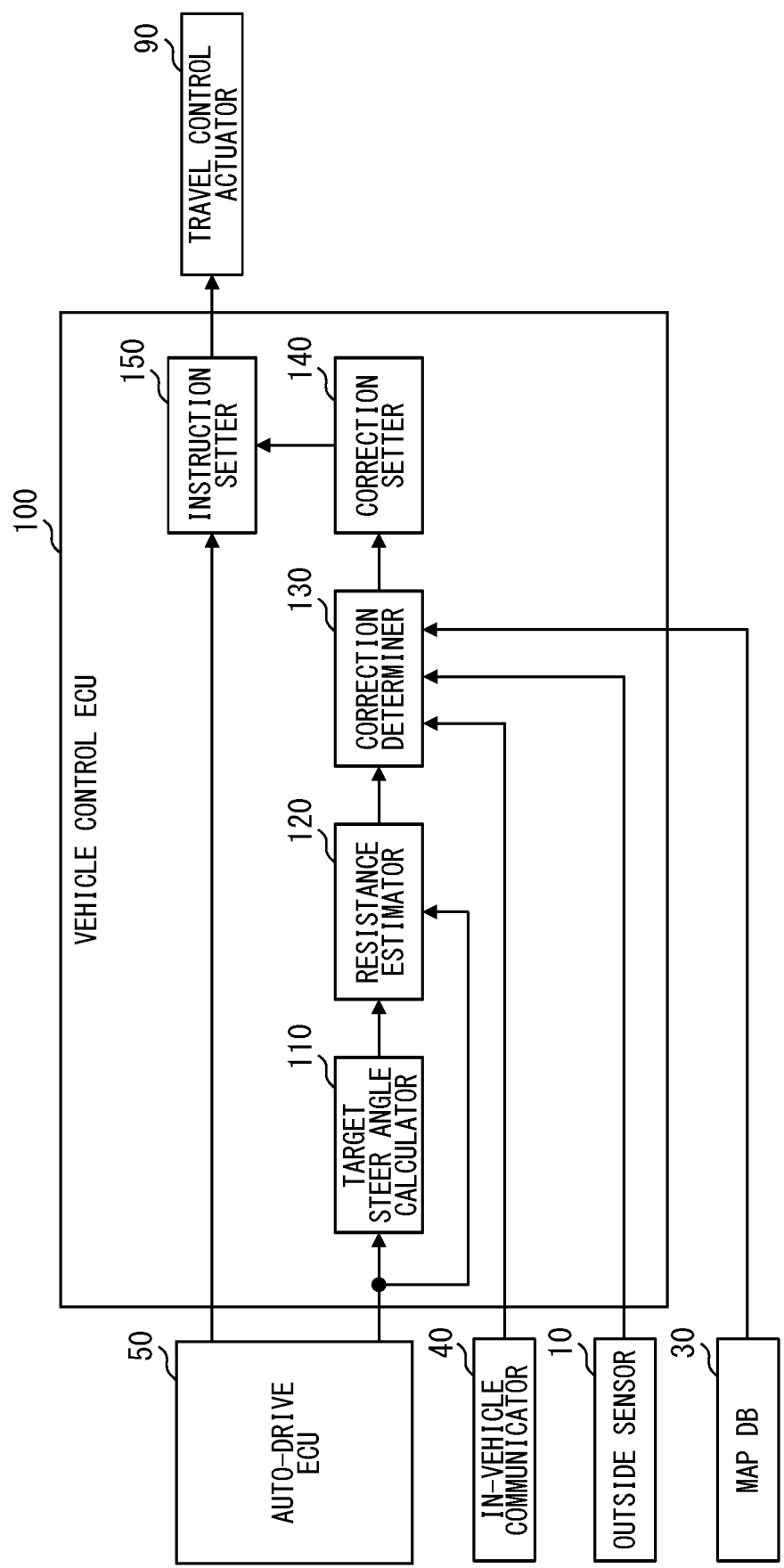
FIG. 2 is a block diagram showing an example of a function of the travel control device.

The processor 102 executes a plurality of instructions included in the travel control program stored in the memory 101. As a result, the vehicle control ECU 100 constructs a plurality of functional units for controlling the vehicle A in the curve travel. In such manner, in the vehicle control ECU 100, a plurality of functional units are constructed by causing the processor 102 to execute a plurality of instructions by the program stored in the memory 101. Specifically, as shown in FIG. 2, the vehicle control ECU 100 is constructed with functional units such as a target steer angle calculator 110, a resistance estimator 120, a correction determiner 130, a correction setter 140, and an instruction setter 150. The target steer angle calculator 110 estimates a target steer angle for a plurality of target positions of the vehicle A. The target steer angle calculator 110 may calculate the target steer angle based on a curvature of the target trajectory and a target vehicle speed at each target position. If curvature information is stored in the target trajectory, the target steer angle calculator 110 may use the stored curvature. Alternatively, the target steer angle calculator 110 may calculate the curvature based on a shape of the target trajectory.

The resistance estimator 120 estimates a cornering resistance, which is a travel resistance acting on the vehicle A in a curved travel section where a curve travel is scheduled to be performed. The curved travel section may be a section in which a curvature of the target trajectory is equal to or greater than a threshold value. Alternatively, the curved travel section may be defined in advance and stored in the map information. The resistance estimator 120 estimates the cornering resistance based on the target steer angle and the target vehicle speed. The resistance estimator 120 may estimate the cornering resistance for each target position of the target trajectory in the curve travel, or may use the cornering resistance at a specific representative target position as the cornering resistance in the curve travel. Alternatively, the resistance estimator 120 may use an average value or a median value of cornering resistances by a specific number of target positions as the cornering resistance in the curve travel.

Figure 3:
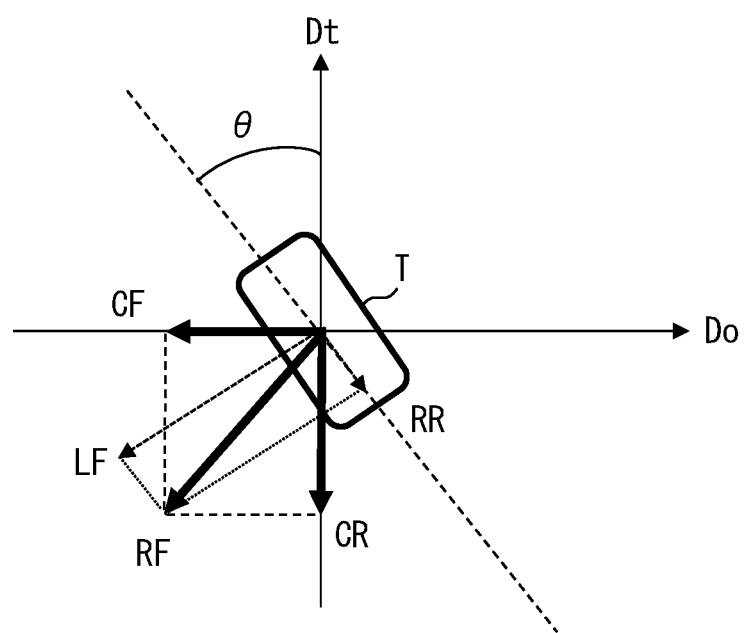
FIG. 3 is a schematic diagram for explaining a cornering resistance.

As shown in FIG. 3, the cornering resistance is a force CR which is a traveling direction component of a resultant force RF made of a lateral force LF and a rolling resistance RR generated when a tire T has a slip angle $\theta$. A force CF which is a component of the resultant force RF in an orthogonal direction with respect to the traveling direction is a cornering force. The cornering resistance is set to a value that (i) increases as a steer angle increases and (ii) increases as a vehicle speed increases. In FIG. 3, Dt is the traveling direction and Do is a direction orthogonal to the traveling direction.

For example, the resistance estimator 120 may estimate the cornering resistance based on a map that stores a correspondence between (i) the steer angle and the vehicle speed and (ii) the cornering resistance. The map is prepared based on an assumption that the road surface has a specific coefficient of friction. In one embodiment, the specific friction coefficient is for a paved road surface in a dry condition. In the following, such a specific friction coefficient may be referred to as an assumed friction coefficient μ0.

Figure 4:
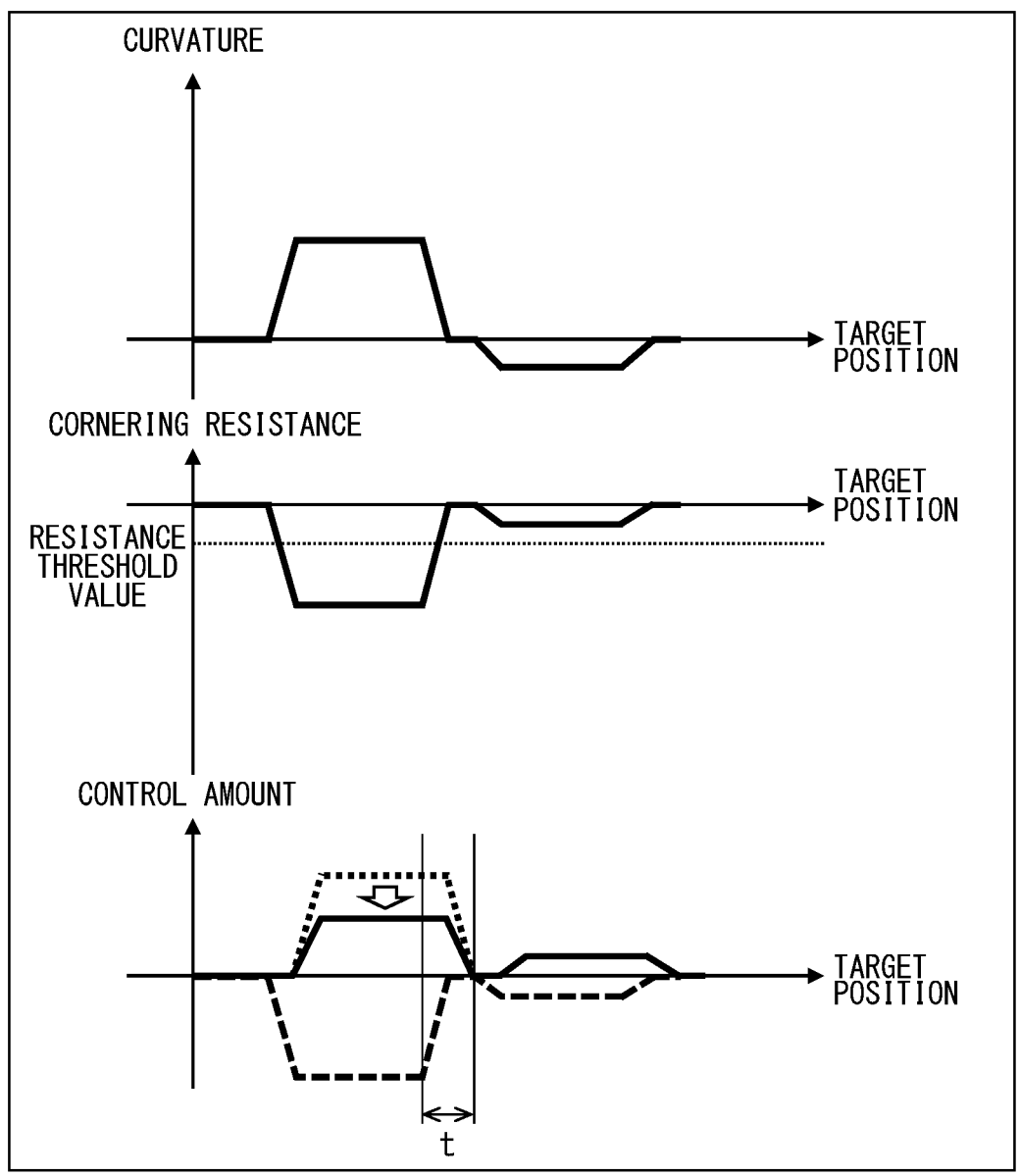
FIG. 4 is a graph showing an example of control amount setting in a curve travel.

The correction determiner 130 determines whether or not to set suppression with respect to the correction control amount, which is a control amount set according to the estimated cornering resistance. The correction control amount is an example of a "correction amount." As shown in FIG. 4, when a response delay occurs in a correction control amount without suppression shown by a dotted line, the correction control amount and a cornering resistance shown by a broken line deviate from each other, thereby a section t in which an acceleration amount in the traveling direction increases may be observed. The suppression of the correction control amount is set in order to reduce discomfort to the occupant due to such an increase in the acceleration amount. A specific example of a determination process of whether or not to set suppression will be described below.

The correction determiner 130 at least determines whether or not the cornering resistance is out of (i.e., exceeding) an allowable resistance range. The allowable resistance range is a numerical range in which the magnitude of an absolute value of the cornering resistance is equal to or less than an absolute value of a resistance threshold value.

The correction determiner 130 determines that suppression for the correction control amount is (i.e., needs to be) set when the cornering resistance is out of the allowable resistance range and an affirmative determination is made for at least one of a plurality of suppression conditions described below.

One of the suppression conditions includes that a current friction coefficient μp of a road surface in a curved travel section is lower than an allowable coefficient range. When an affirmative determination is made, that is, when a determination that the current friction coefficient μp is lower than the allowable coefficient range is made, the correction determiner 130 determines that the suppression with respect to the correction control amount is set.

Here, the allowable coefficient range is a numerical range in which the magnitude of the current friction coefficient μp is equal to or greater than a friction coefficient threshold μth. In one embodiment, the friction coefficient threshold μth is equal to the assumed friction coefficient μ0. That is, in such case, if it is determined that the current friction coefficient μp is less than the assumed friction coefficient μ0, it is determined that suppression of the correction control amount is set.

The correction determiner 130 may estimate the current friction coefficient μp based on detection information of the outside sensor 10, such as an image captured by the camera. Alternatively, the correction determiner 130 may acquire information on the current friction coefficient pp from the outside via the in-vehicle communication device 40. Alternatively, the correction determiner 130 may calculate the current friction coefficient μp based on a vehicle model.

Another suppression condition includes that a risk of swerve from the target trajectory in a curved travel section is out of a permissible risk range. Here, the target trajectory is an example of an "assumed path." The swerve risk is a risk when the vehicle swerves or deviates from the target trajectory in a curve travel. The permissible risk range is a numerical range in which the swerve risk is equal to or less than a risk threshold value. When an affirmative determination is made, that is, when a determination that the swerve risk is out of the permissible risk range is made, the correction determination unit 130 determines that the suppression with respect to the correction control amount is set.

For example, the swerve risk is an index based on a distance from the target trajectory to a travelable boundary on the road surface. The smaller the distance is, the higher the swerve risk may become. The travelable boundary here may be a line of travel lane in which the vehicle A is currently traveling or a planned travel lane. Alternatively, the travelable boundary may be a virtual boundary line virtually set inside a lane by a predetermined distance from the line of travel lane. Alternatively, the travelable boundary may be a feature such as a curb or a wall on a shoulder of the road. The correction determiner 130 may determine the travelable boundary based on the map information, the detection information of the outside sensor 10, and the like.

Alternatively, the swerve risk may be an index based on an approachability of other moving object(s) to the vehicle A. The higher the approachability is, the higher the swerve risk may become. Other moving objects may be pedestrians, other vehicles, and the like. For example, the correction determiner 130 may estimate an approachability based on a movement route and the target trajectory of the vehicle A after predicting the movement route. In such case, the correction determiner 130 may predict the movement route based on a learned model that outputs the movement route in response to an input of moving object information such as the position, the movement direction, and the movement speed of the other moving object. Further, the correction determiner 130 may acquire the movement route if the movement route has been predicted by the auto-drive ECU 50, the external server, or the like.

Alternatively, the swerve risk may be an index based on a possibility of other moving object rushing out with respect to a road section where a curve travel is scheduled to be carried out. The higher the possibility of rushing out, the higher the swerve risk. The possibility of rushing out may be predicted by, for example, an external server and acquired from the server by communication.

Further, the swerve risk may be an index in which the above-mentioned plurality of parameters are integrated. The swerve risk may be set to be reduced/deducted in certain circumstances. For example, under a legal system of right-side traffic, the swerve risk may be reduced in a situation where a subject vehicle makes a right turn at an intersection before approaching of an oncoming vehicle.

Yet another suppression condition includes continuous curved travel sections (i.e., plural curved sections continue in a travel of the vehicle A). When an affirmative determination is made, that is, when a determination that a continuous condition is satisfied is made, the correction determiner 130 determines that the suppression for the correction control amount is set.

For example, the correction determiner 130 determines that the continuous condition is satisfied when the cornering resistance is out of the allowable resistance range a plurality of times within a set duration of time. For example, as shown in FIG. 5, when (i) an absolute value of the cornering resistance comes out of the allowable resistance range for the first time, then returns to be within the allowable resistance range, and subsequently comes out of the allowable resistance range for the second time, and (ii) a lapse time from a first out-of-range timing to a second out-of-range timing corresponding to a section s is within a set duration of time, it is determined that the continuous condition is satisfied.

Note that the correction control amount for which suppression is set for an occasion of when it is determined that the continuous condition is satisfied is at least the correction control amount in the first curve travel (i.e., first one of the two curve travels described above). With respect to the correction control amount corresponding to the second and subsequent curve travels, whether to set suppression or not is determined based on the determination process described above after setting the relevant curve travel as the first curve travel.

The correction setter 140 sets the correction control amount for the cornering resistance based on the determination result of the correction determiner 130. Specifically, when determining that the suppression with respect to the correction control amount is not set, the correction setter 140 determines the driving force substantially equivalent to the cornering resistance as the correction control amount.

Figure 5:
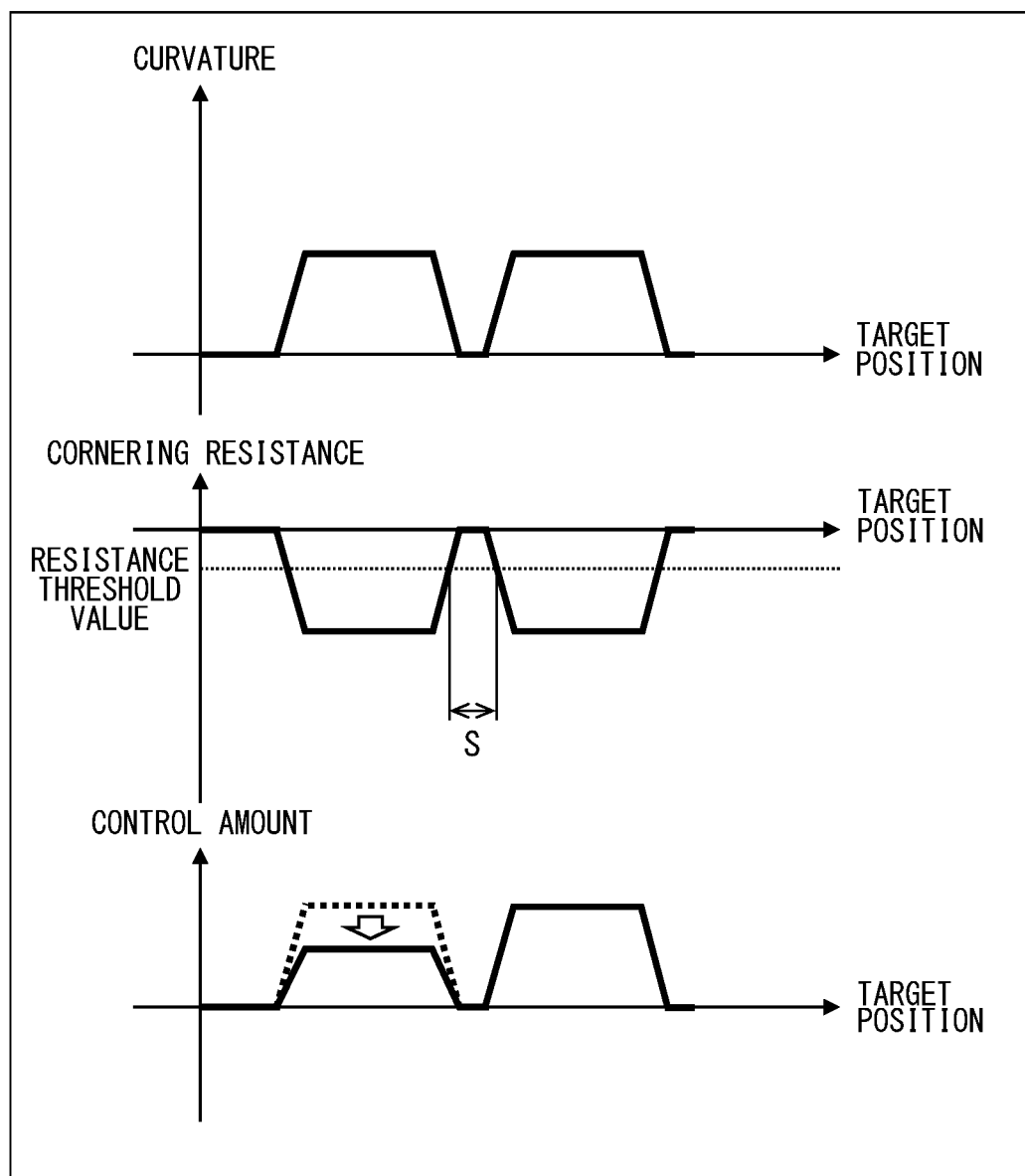
FIG. 5 is a graph showing an example of control amount setting in the curve travel.

On the other hand, when determining that the suppression for the correction control amount is set, the correction setter 140 sets the correction control amount as a value calculated by multiplying the correction control amount of non-suppressing time with a predetermined suppression rate (see FIGS. 4 and 5). For example, the correction setter 140 determines the suppression rate based on the target speed of the vehicle A in the curve travel. Specifically, the correction setter 140 sets a higher suppression rate as the target speed increases, at least within a set speed range. The target speed here is an example of a "planned travel speed."

Figure 6:
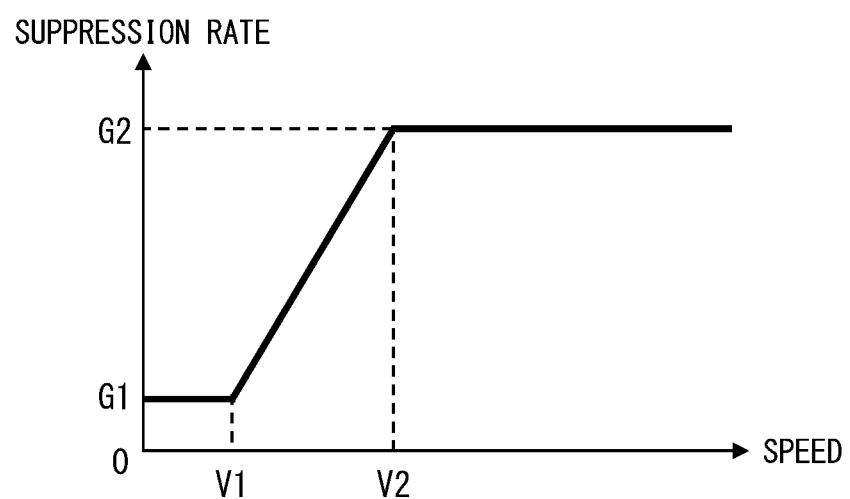
FIG. 6 is a graph showing an example of a control amount suppression rate according to a speed.

For example, as shown in FIG. 6, in the preset range from a speed V1 to a speed V2, the suppression rate gradually increasing from G1 to G2 is set. When the speed is lower than V1, the suppression rate is constant at G1, and when the speed is higher than V2, the suppression rate is constant at G2. Note that, in a graph of FIG. 6, the suppression rate is set to increase linearly with respect to the speed, but it may be set to increase non-linearly.

Note that the correction setter 140 may determine the suppression rate based on a parameter other than the speed. For example, the correction setter 140 may determine the suppression rate based on the lateral acceleration (so-called lateral G) acting on the vehicle A at each target position. In such case, the correction setter 140 may set the suppression rate to be greater as the lateral G increases.

The instruction setter 150 calculates an instruction control amount to be output to the travel control actuator 90. The instruction setter 150 may use a value obtained by adding the correction control amount to the target control amount as the instruction control amount. The instruction setter 150 may acquire the target control amount from the auto-drive ECU 50. Alternatively, the instruction setter 150 may calculate the target control amount based on the target trajectory. The instruction setter 150 outputs the calculated instruction control amount to the travel control actuator 90, sequentially or on demand.

Next, a flow of the travel control method performed by the vehicle control ECU 100 in collaboration with functional blocks will be described below with reference to FIG. 7. In the flow described below, "S" means a plurality of steps of the flow executed by a plurality of instructions included in a program.

First, in S100, the target steer angle calculator 110 calculates a target steer angle. Next, in S110, the resistance estimator 120 estimates a cornering resistance at each target position. Subsequently in S120, the correction determiner 130 determines whether or not the cornering resistance is out of an allowable resistance range.

When it is determined that the cornering resistance is not outside the allowable resistance range, that is, within the allowable resistance range, the flow shifts to S130. In S130, the correction setter 140 sets that there is no correction control amount. After the processing of S130, the flow shifts to S190 described later.

On the other hand, when it is determined in S120 that the cornering resistance is out of the allowable resistance range, the flow shifts to S140. In S140, the correction determiner 130 calculates whether or not the current friction coefficient μp is less than the assumed friction coefficient μ0. When it is determined that the current friction coefficient μp is less than the assumed friction coefficient μ0, the flow shifts to S170 described later. On the other hand, when it is determined that the current friction coefficient μp is less than the assumed friction coefficient μ0, the flow shifts to S150.

In S150, the correction determiner 130 determines whether or not the swerve risk in the curve travel is out of the permissible risk range. When it is determined that the swerve risk is out of the permissible risk range, the flow shifts to S170. On the other hand, when it is determined that the swerve risk is not outside the permissible risk range, that is, within the permissible risk range, the flow shifts to S160.

In S160, the correction determiner 130 determines whether or not the continuous condition of the curve travel is satisfied. When it is determined that the continuous condition is satisfied, the flow shifts to S170. In S170, the correction setter 140 sets the suppressed correction control amount. On the other hand, when it is determined in S160 that the continuous condition is not satisfied, the flow shifts to S180. In S180, the correction setter 140 sets a correction control amount that is not suppressed.

After the processing of S130, S170 or S180, in S190, the instruction setter 150 calculates an instruction control amount based on the correction control amount and the target control amount. The calculated instruction control amount is output to the travel control actuator 90.

Note that the above-mentioned S110 is an example of a "resistance estimation step," S120, S140, S150, and S160 are examples of a "determination step," and S130, S170, and S180 are examples of a "correction setting step."

According to the first embodiment described above, when it is determined that the cornering resistance is out of the allowable resistance range and the suppression condition is satisfied, the correction amount set for the control amount of the driving force according to the cornering resistance is suppressed than the correction amount for an occasion of when the suppression condition is not satisfied. Therefore, under a condition that the suppression condition is satisfied, the feeling of discomfort in travel due to (i.e., caused by) the correction amount is reducible. In such manner, it is possible to make a travel of the vehicle A with less discomfort of the occupant.

Further, according to the first embodiment, the suppression condition includes that the friction coefficient of the road surface in the curved travel section is lower than the allowable coefficient range. Therefore, when the friction coefficient of the road surface is relatively small and the difficulty of travel is high, the correction amount can be suppressed. Therefore, in a situation where the discomfort of travel based on the response delay of the correction amount may increase in the curve travel, the discomfort is suppressible more reliably.

In addition, according to the first embodiment, the suppression condition includes that the swerve risk from the assumed path in the curved travel section is outside the permissible risk range. Therefore, in a situation where the swerve risk is high, the deviation from the assumed path due to the response delay of the correction amount can be suppressed.

Further, according to the first embodiment, the suppression condition includes that the curved travel sections continue. Therefore, even if the response delay of the correction amount occurs, the approach to the subsequent curved travel section can be performed more smoothly.

Further, according to the first embodiment, when the cornering resistance is out of the allowable resistance range a plurality of times within the set duration of time, it is determined that the curved travel sections are continuous. Therefore, continuous curved travel sections are determinable more reliably.

In addition, according to the first embodiment, the correction amount in at least the first curved travel section of the continuous curved travel sections is suppressed. Therefore, the travel of the first curved travel section, which affects the approach to the subsequent curved travel section(s), is more smoothly performable.

Further, according to the first embodiment, the degree of suppression of the correction amount is changed according to the planned travel speed in the curved travel section. Therefore, the correction amount can be suppressed by the degree of suppression according to the travel speed of the vehicle A, which affects the discomfort caused by the response delay of the correction amount. Therefore, the correction scheme of the present embodiment may make it possible to provide suppression having a more appropriate correction amount.

Other Embodiments

The present disclosure herein is not limited to the illustrated embodiments. The disclosure includes exemplary embodiments and modifications by those skilled in the art based on them. For example, the disclosure is not limited to the part and/or element combinations shown in the embodiments. The disclosure can be carried out in various combinations. The disclosure can have additional portions that can be added to the embodiment. The disclosure includes those in which the parts and/or elements of the embodiment are omitted. The disclosure includes the replacement or combination of parts and/or elements between one embodiment and another. The disclosed technical scope is not limited to the description of the embodiments. The several technical scopes disclosed are indicated by the description of the claims, and should be construed to include all modifications within the meaning and scope equivalent to the description of the claims.

In the above-described embodiment, the dedicated computer constituting the travel control device is assumed to be the vehicle control ECU 100. Instead of the above, the dedicated computer constituting the travel control device may also be the auto-drive ECU 50. Alternatively, the dedicated computer constituting the travel control device may also be a navigation ECU. Alternatively, the dedicated computer constituting the travel control device may also be an HCU (HMI (Human Machine Interface) Control Unit) that controls information display of an information display system. Further, the dedicated computer constituting the travel control device may also be a locator ECU that estimates the current position of the vehicle A. Further, the dedicated computer constituting the travel control device may also be a server device provided outside the vehicle A.

As a modification of the above-described embodiment, the vehicle control ECU 100 may execute a correction control amount suppression process in a manual operation mode.

As a modification of the above-described embodiment, the vehicle control ECU 100 may determine whether or not only one or two of the three suppression conditions are satisfied. Further, the vehicle control ECU 100 may determine whether or not the other suppression conditions are satisfied.

As a modification of the above-described embodiment, the vehicle control ECU 100 may set the timing of applying the correction control amount earlier in consideration of the response delay.

The vehicle control ECU 100 may be a dedicated computer configured to include at least one of a digital circuit and an analog circuit as a processor. Here, particularly a digital circuit includes, for example, at least one of ASIC (Application Specific Integrated Circuit), FPGA (Field Programmable Gate Array), SOC (System on a Chip), PGA (Programmable Gate Array), CPLD (Complex Programmable Logic Device) and the like. Such a digital circuit may include a memory in which a program is stored.

The vehicle control ECU 100 may be provided by one computer, or a set of computer resources linked by a data communication device. For example, a part of the functions provided by the vehicle control ECU 100 in the above-described embodiment may be realized by another ECU.

What is claimed is:
1. A travel control device that controls a travel of a vehicle, comprising:
at least one of (i) a circuit, or (ii) a processor, a non-transitory computer-readable storage medium, and a set of computer-executable instructions that is stored on the non-transitory computer-readable storage medium and executed by the processor,
wherein the at least one of (i) the circuit, or (ii) the processor, the non-transitory computer-readable storage medium, and the set of computer-executable instructions is configured to:
estimate a cornering resistance, which is a travel resistance acting on the vehicle in a curved travel section where a curved travel is scheduled based on a steer angle;
determine whether the cornering resistance is out of an allowable resistance range; and
set a correction amount of a control amount of a driving force based on determining that the cornering resistance is out of the allowable resistance range, wherein
based on determining that the cornering resistance is out of the allowable resistance range, the at least one of (i) the circuit, or (ii) the processor, the non-transitory computer-readable storage medium, and the set of computer-executable instructions is configured to further determine whether at least one suppression condition for suppressing the correction amount is satisfied, and
based on the at least one suppression condition being satisfied, the at least one of (i) the circuit, or (ii) the processor, the non-transitory computer-readable stor- age medium, and the set of computer-executable instructions is configured to suppress the correction amount.

2. The travel control device of claim 1, wherein
the at least one suppression condition includes a friction condition, and
the friction condition requires that a current friction coefficient, of a road surface in the curved travel section, is lower than a threshold friction coefficient.

3. The travel control device of claim 1, wherein
the at least one suppression condition includes a swerve risk condition, and
the swerve risk condition requires that a swerve risk of swerving from an assumed path in the curved travel section is out of a permissible swerve risk range.

4. The travel control device of claim 1, wherein
the at least one suppression condition includes a sequential curved sections condition, and
the sequential curved sections condition requires, in part, at least two curved travel sections in series.

5. The travel control device of claim 4, wherein
the sequential curved sections condition further requires that
the cornering resistance is out of the allowable resistance range a plurality of times within a set duration of time while traveling through the at least two curved travel sections in series.

6. The travel control device of claim 4, wherein
the at least one of (i) the circuit, or (ii) the processor, the non-transitory computer-readable storage medium, and the set of computer-executable instructions is configured to suppress the correction amount in at least a first curved travel section of the at least two curved travel sections in series.

7. The travel control device of claim 1, wherein
the at least one of (i) the circuit, or (ii) the processor, the non-transitory computer-readable storage medium, and the set of computer-executable instructions is configured to change a degree of suppression of the correction amount as a function of a planned travel speed in the curved travel section.

8. A travel control method executed by a processor to control a travel of a vehicle, the travel control method comprising:
estimating a cornering resistance, which is a travel resistance acting on the vehicle in a curved travel section where a curved travel is scheduled based on a steer angle; and
determining whether or not the estimated cornering resistance is within an allowable resistance range;
setting a correction amount according to the cornering resistance with respect to a control amount of a driving force applied to the vehicle based on determining that the cornering resistance is out of the allowable resistance range;
determining whether or not a suppression condition for suppressing the correction amount is satisfied; and
suppressing the correction amount based on the suppression condition being satisfied as compared with an occasion of when it is determined that the suppression condition is not satisfied.

9. The travel control method of claim 8, wherein
the suppression condition determines whether a current friction coefficient of a road surface in a curved travel section is lower than a threshold friction coefficient.

10. The travel control method of claim 8, wherein
the suppression condition determines that a swerve risk in the curved travel section is out of a permissible risk range.

11. The travel control method of claim 8, wherein
the suppression condition determines whether at least two curved travel sections are in series.

12. The travel control method of claim 11, wherein
the suppression condition determines whether the cornering resistance is out of the allowable resistance range a plurality of times within a set duration of time while traveling the at least two curved travel sections.

13. The travel control method of claim 11, wherein
the correction amount is suppressed in at least a first curved travel section of the at least two curved travel sections.

14. The travel control method of claims 8, wherein
a degree of suppression of the correction amount is changed as a function of a planned travel speed in the curved travel section.

15. A non-transitory, storage medium storing computer-readable instructions as a travel control program to be executed by a processor for controlling a travel of a vehicle, the computer-readable instructions comprising:
estimating a cornering resistance, which is a travel resistance acting on the vehicle in a curved travel section where a curved travel is scheduled based on a steer angle, and
determining whether or not the cornering resistance is out of an allowable resistance range, and
setting a correction amount according to the cornering resistance with respect to a control amount of a driving force applied to the vehicle based on determining that the cornering resistance is out of the allowable resistance range, wherein
based on determining that the cornering resistance is out of the allowable resistance range, further determining whether an at least one suppression condition for suppressing the correction amount is satisfied, and
based on the at least one suppression condition being satisfied, the correction amount is suppressed.

16. The travel control device of claim 1, wherein
the cornering resistance comprises a resistance in an orthogonal direction with respect to a traveling direction of the vehicle.

* * * * *